US012105884B2

(12) United States Patent
Dao et al.

(10) Patent No.: US 12,105,884 B2
(45) Date of Patent: Oct. 1, 2024

(54) TOUCHLESS, GESTURE-BASED HUMAN INTERFACE DEVICE

(71) Applicants: Jadelynn Kim Dao, San Jose, CA (US); Advit Deepak, San Jose, CA (US)

(72) Inventors: Jadelynn Kim Dao, San Jose, CA (US); Advit Deepak, San Jose, CA (US)

(*) Notice: Subject to any disclaimer, the term of this patent is extended or adjusted under 35 U.S.C. 154(b) by 0 days.

(21) Appl. No.: 17/390,843

(22) Filed: Jul. 30, 2021

(65) Prior Publication Data
US 2023/0031200 A1 Feb. 2, 2023

(51) Int. Cl.
*G06F 3/01* (2006.01)
*G06F 3/0486* (2013.01)
*G06T 7/20* (2017.01)
*G06T 7/521* (2017.01)

(52) U.S. Cl.
CPC .......... *G06F 3/017* (2013.01); *G06F 3/0486* (2013.01); *G06T 7/20* (2013.01); *G06T 7/521* (2017.01)

(58) Field of Classification Search
CPC ........ G06F 3/017; G06F 3/0486; G06T 7/20; G06T 7/521
See application file for complete search history.

(56) References Cited

U.S. PATENT DOCUMENTS

| | | | | |
|---|---|---|---|---|
| 2,424,499 | A * | 7/1947 | Pasturczak | F16M 11/2035 248/183.3 |
| 5,818,437 | A * | 10/1998 | Grover | G06F 3/03545 715/811 |
| 8,212,768 | B2 * | 7/2012 | Fein | G03H 1/0005 715/848 |
| 9,916,009 | B2 * | 3/2018 | Zagorsek | G06F 3/017 |
| 2007/0211023 | A1 * | 9/2007 | Boillot | G06F 3/04886 345/156 |
| 2009/0237361 | A1 * | 9/2009 | Mosby | G06F 3/04886 345/173 |
| 2009/0316952 | A1 * | 12/2009 | Ferren | G06F 3/0425 382/103 |
| 2010/0199232 | A1 * | 8/2010 | Mistry | G06F 3/0426 715/863 |
| 2011/0234638 | A1 * | 9/2011 | Hill | G06F 3/0486 345/661 |

(Continued)

FOREIGN PATENT DOCUMENTS

| | | | |
|---|---|---|---|
| CN | 102566744 | A * | 7/2012 |
| CN | 102368290 | B * | 12/2012 |
| CN | 106325481 | A * | 1/2017 |

*Primary Examiner* — Kirk W Hermann
(74) *Attorney, Agent, or Firm* — Greenberg Traurig, LLP

(57) ABSTRACT

Method and capability to yield gesture-based, touchless communication between user and electronic device. The system identifies hand or finger gestures by utilizing depth-mapping-based camera sensor technology, eliminating the necessity of a touch or hover sensitive device. With the use of an inertial measurement unit or similar gyroscopic sensor(s), the system will be portable and be able to function as a wearable, In particular implementations, "mouse movement gestures", "pinch gestures", "twist gestures", and other gestures of the like can, but are not limited to, be used to provide input, actuate commands, manipulate display(s), and allow access to applications.

25 Claims, 21 Drawing Sheets

(56) References Cited

U.S. PATENT DOCUMENTS

| | | | | |
|---|---|---|---|---|
| 2012/0154313 | A1* | 6/2012 | Au | G06F 3/04883 345/173 |
| 2013/0265218 | A1* | 10/2013 | Moscarillo | G06F 3/0426 345/156 |
| 2014/0059365 | A1* | 2/2014 | Heo | G06F 1/3215 713/320 |
| 2014/0198031 | A1* | 7/2014 | Xiong | G06V 40/113 382/103 |
| 2018/0221177 | A1* | 8/2018 | Kaltenbach | G06F 3/0383 |
| 2018/0338126 | A1* | 11/2018 | Trevor | H04N 23/62 |
| 2019/0094981 | A1* | 3/2019 | Bradski | H04N 21/414 |
| 2020/0042087 | A1* | 2/2020 | Ang | G06F 3/0482 |
| 2020/0089400 | A1* | 3/2020 | Zarraga | G06F 3/04144 |
| 2020/0097081 | A1* | 3/2020 | Stone | G06F 3/015 |
| 2021/0064147 | A1* | 3/2021 | Arora | G06V 40/28 |
| 2021/0194942 | A1* | 6/2021 | Kane | G06F 3/017 |
| 2021/0333884 | A1* | 10/2021 | Li | G06T 7/20 |
| 2021/0347053 | A1* | 11/2021 | Lee | B25J 9/1653 |
| 2022/0377486 | A1* | 11/2022 | Arya | G02B 27/0176 |
| 2023/0014068 | A1* | 1/2023 | Ayoub | G06F 3/017 |

\* cited by examiner

Figure 1 - Image of Depth Map
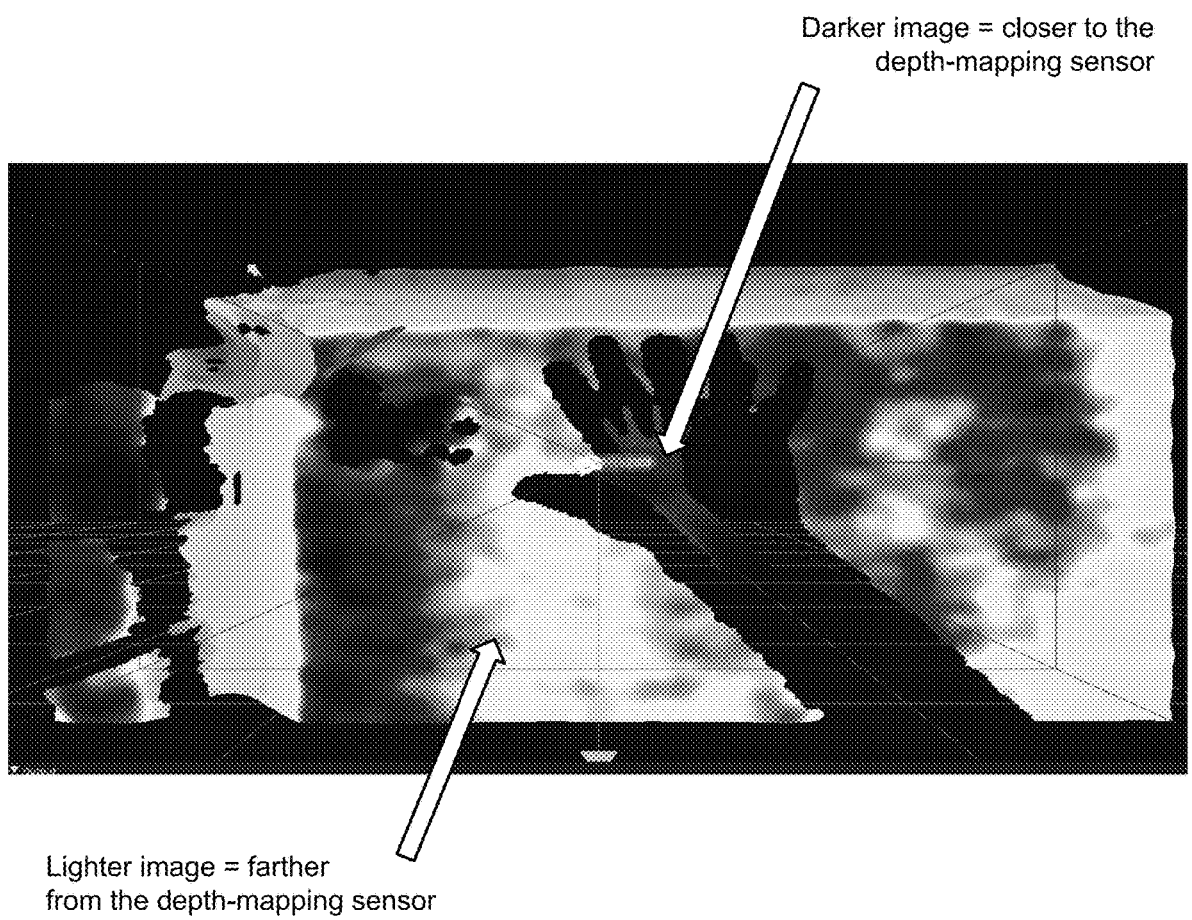

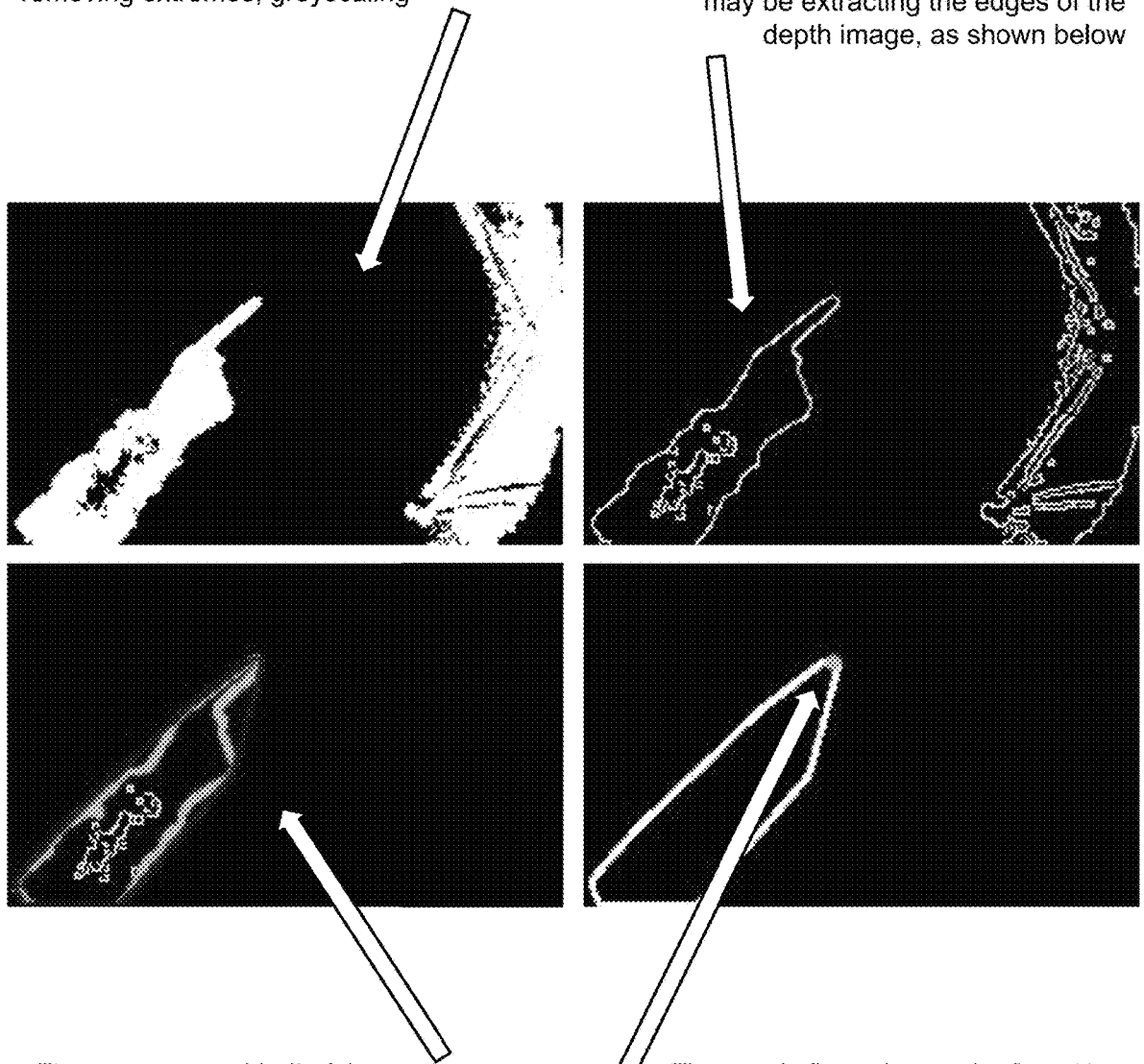

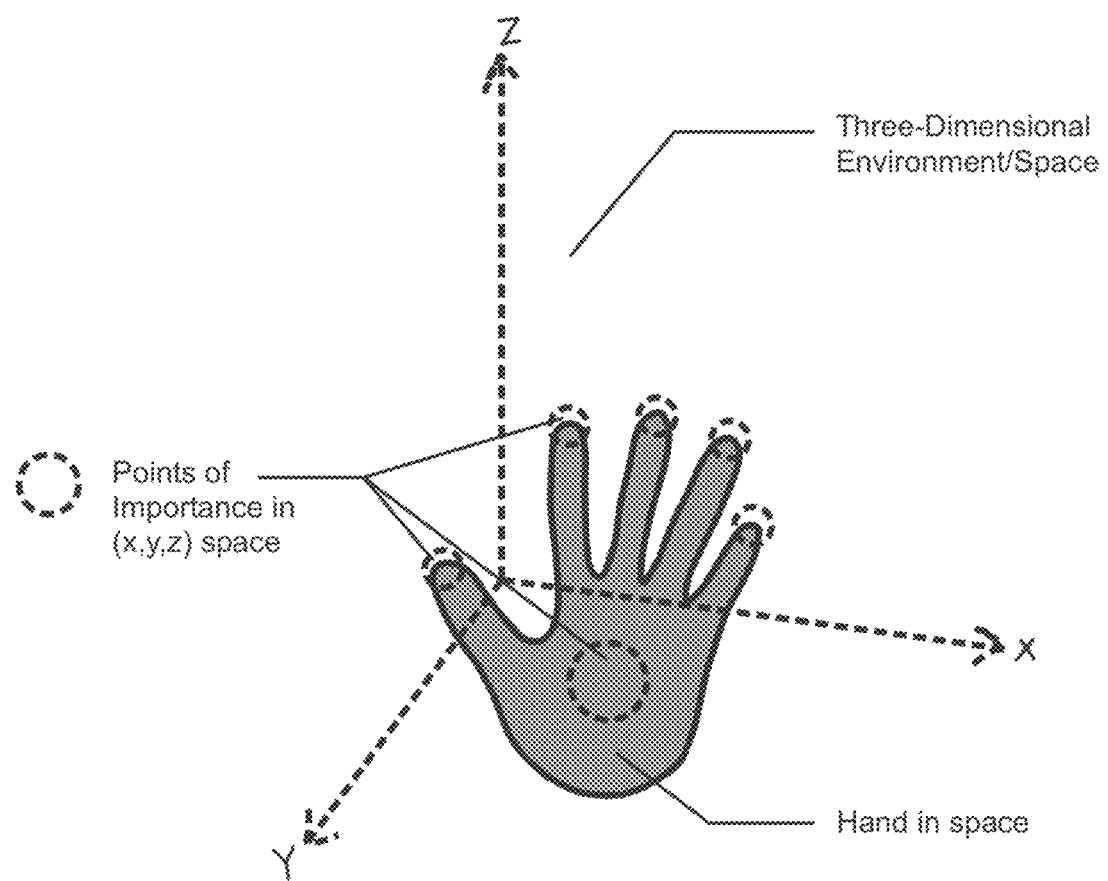
Figure 3: Tracking Location of Key Hand/Finger Points

Figure 4: Possible Hand Infrared Sensor Placements
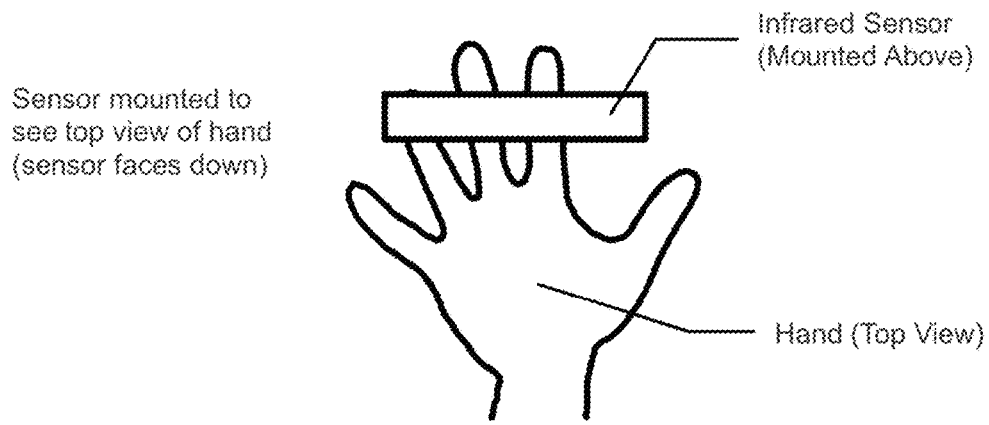
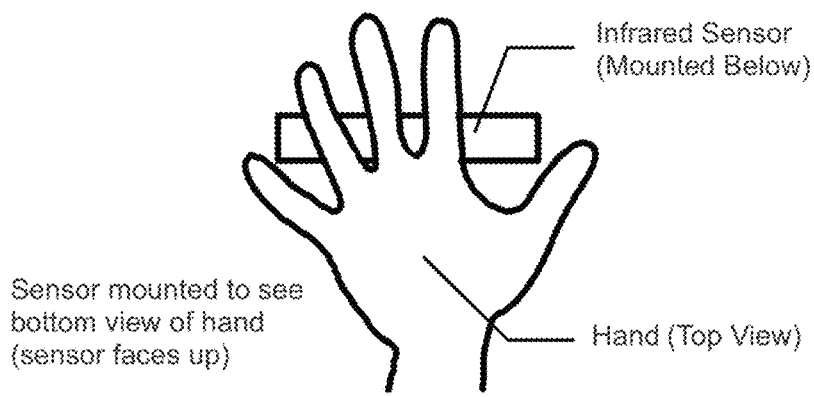
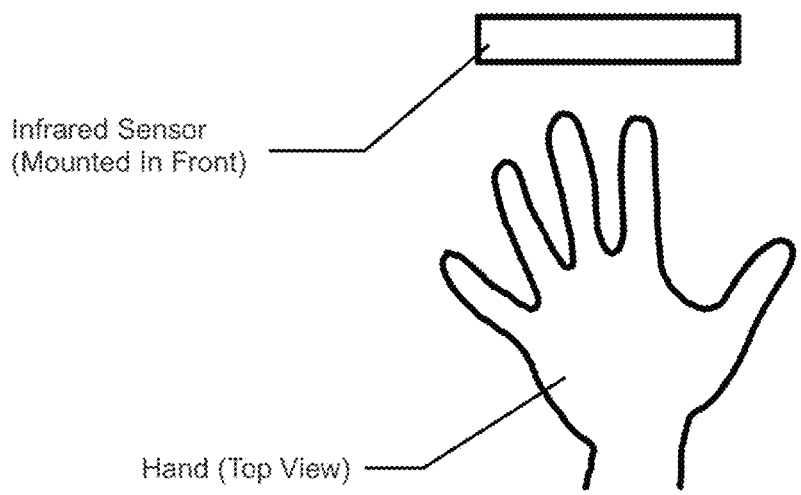

Figure 5: Depth Image Point of View
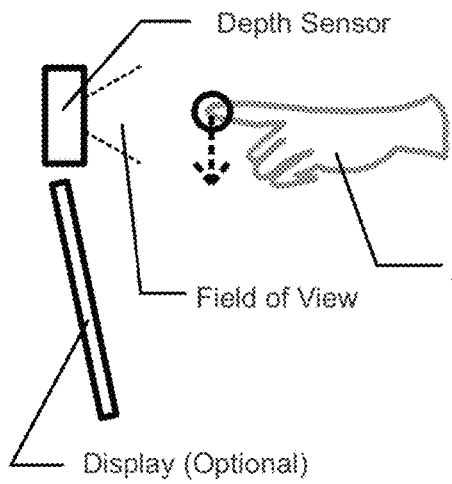 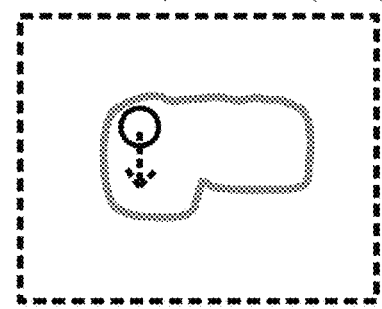
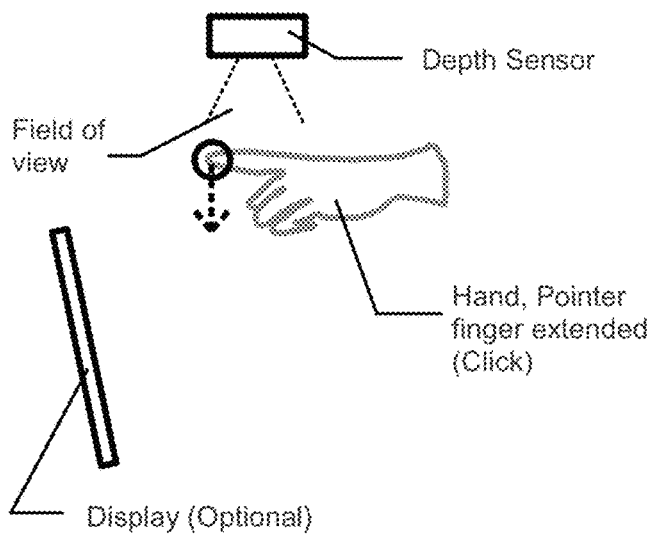 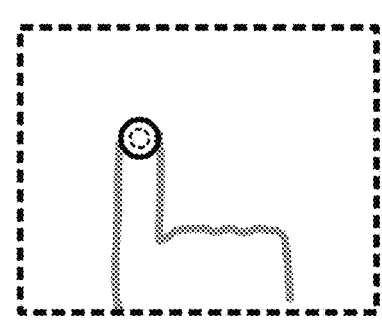

Figure 6 - Algorithm Flowchart
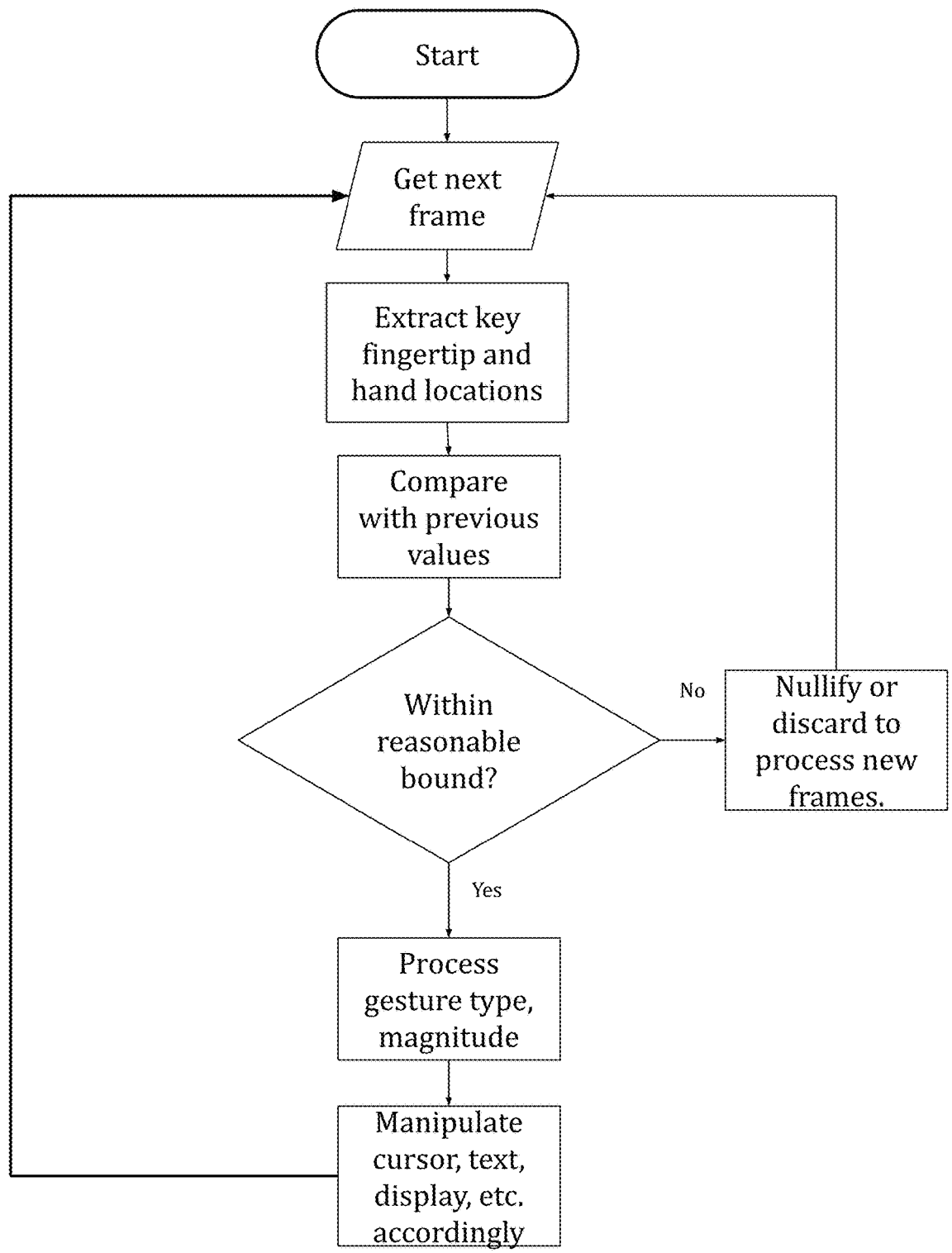

Figure 7: Determining Clicks Example Gesture
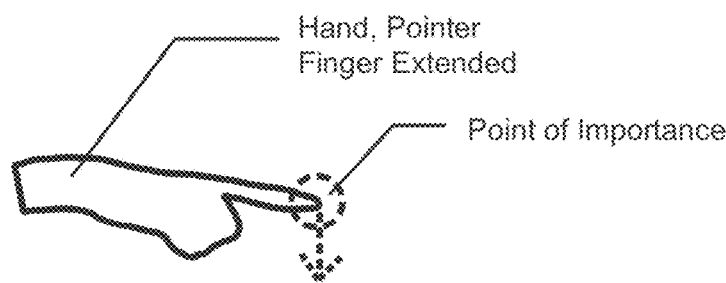

Figure 8: Other Standard Mouse Commands
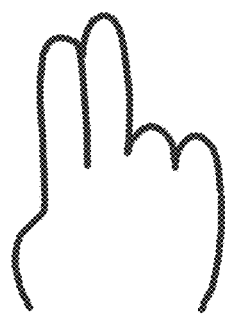
Hand, Pointer and Middle Finger Extended
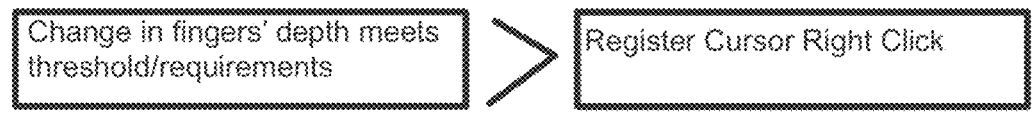

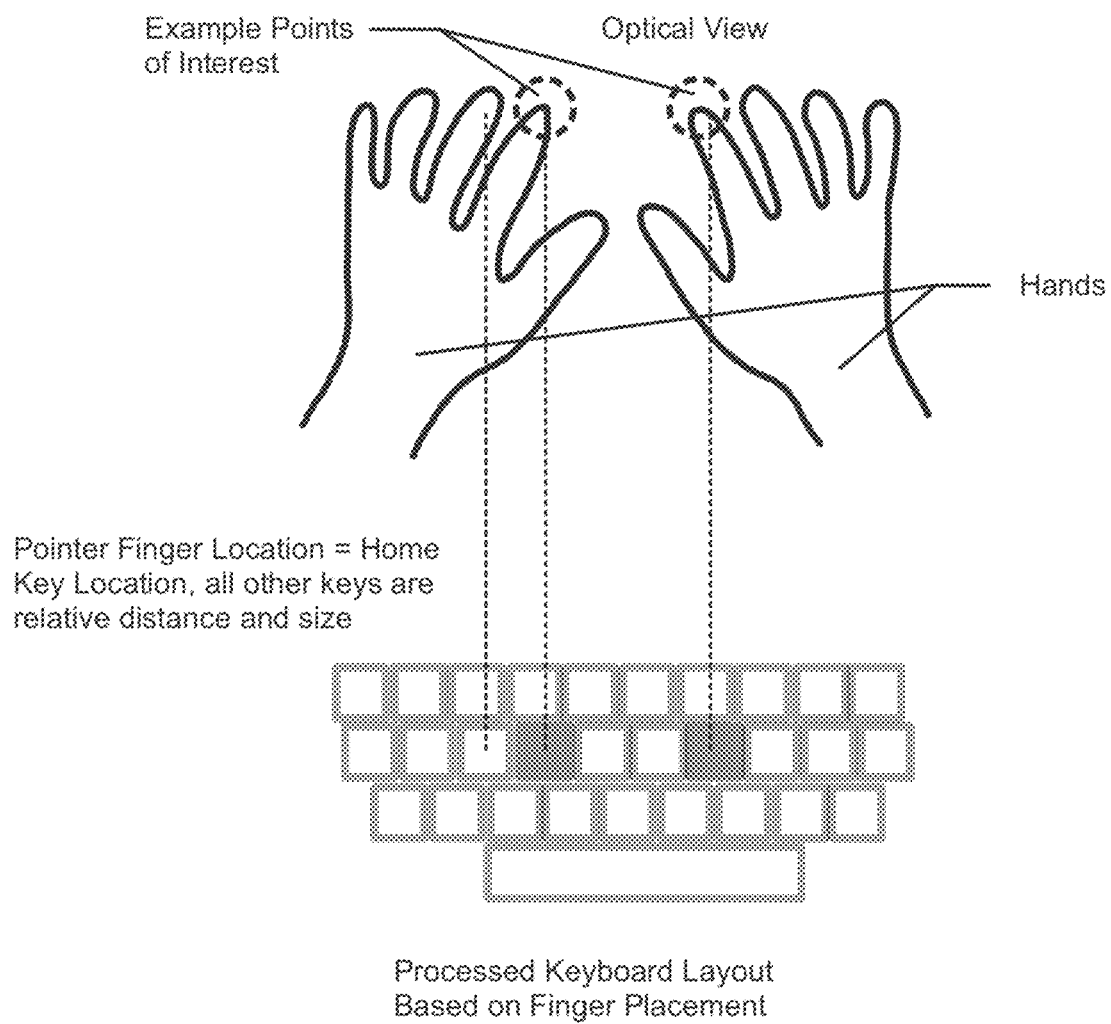

Figure 10 - Virtual Keyboard GUI

Each character in the English alphabet is included in the standard QWERTY layout. Numbers and symbols will be included as well.

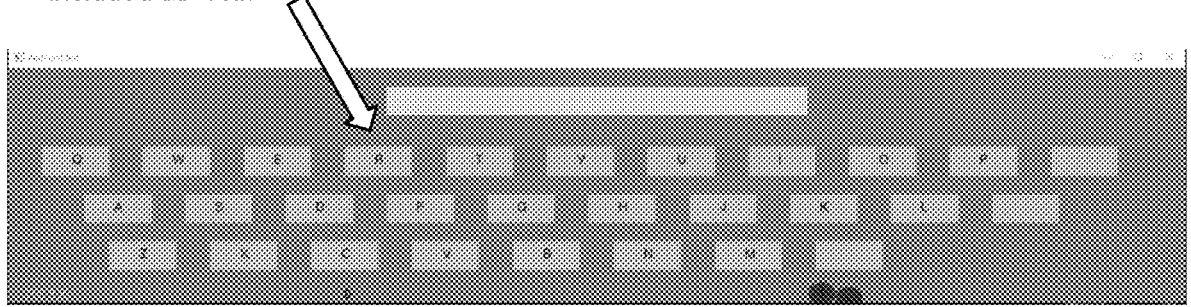

Each fingertip may be represented by a circle. When no fingers have been detected, the circles may be stationary off the keys.

The bar at the top of the GUI may be used to display information, toggle controls for the keyboard, and include other functions.

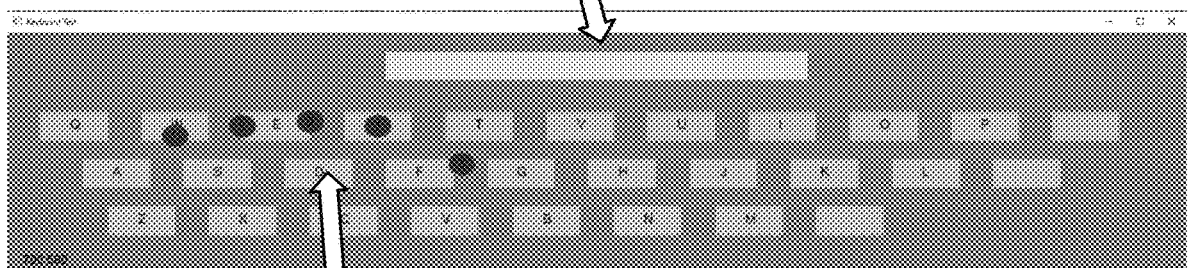

An example of the user's left hand being displayed on the virtual keyboard GUI. Each of the five fingertips are represented by numbered circles, displayed in their respective planar locations .

Figure 11: Drag Cursor Manipulation
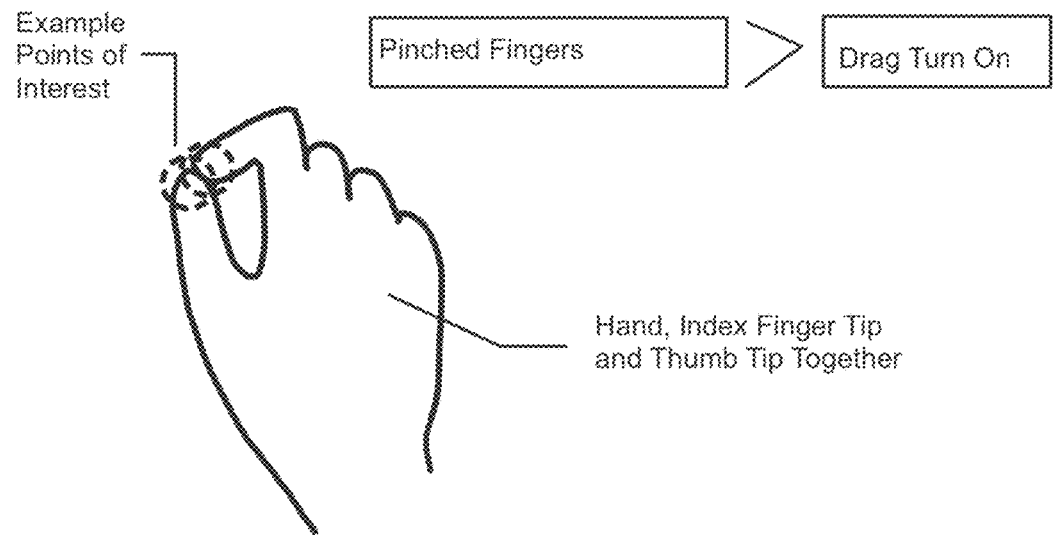
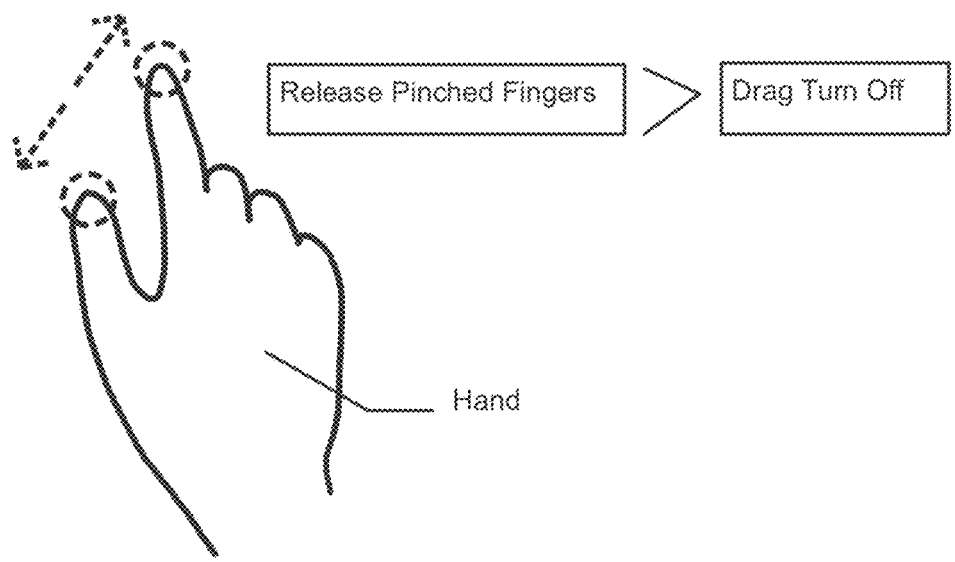

Figure 12 - Inertial Measurement Unit
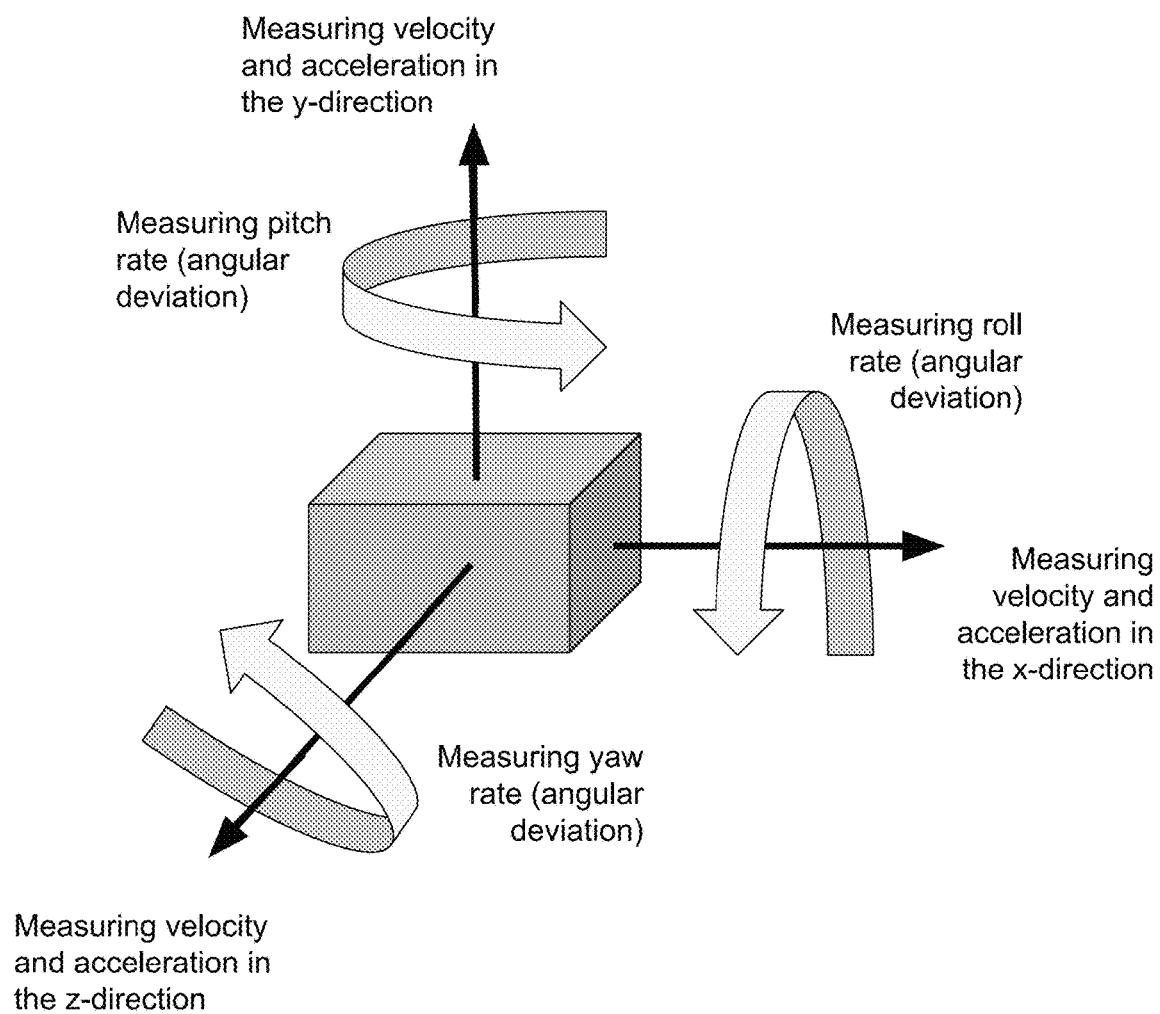

Figure 13 - Simultaneous Localization and Mapping
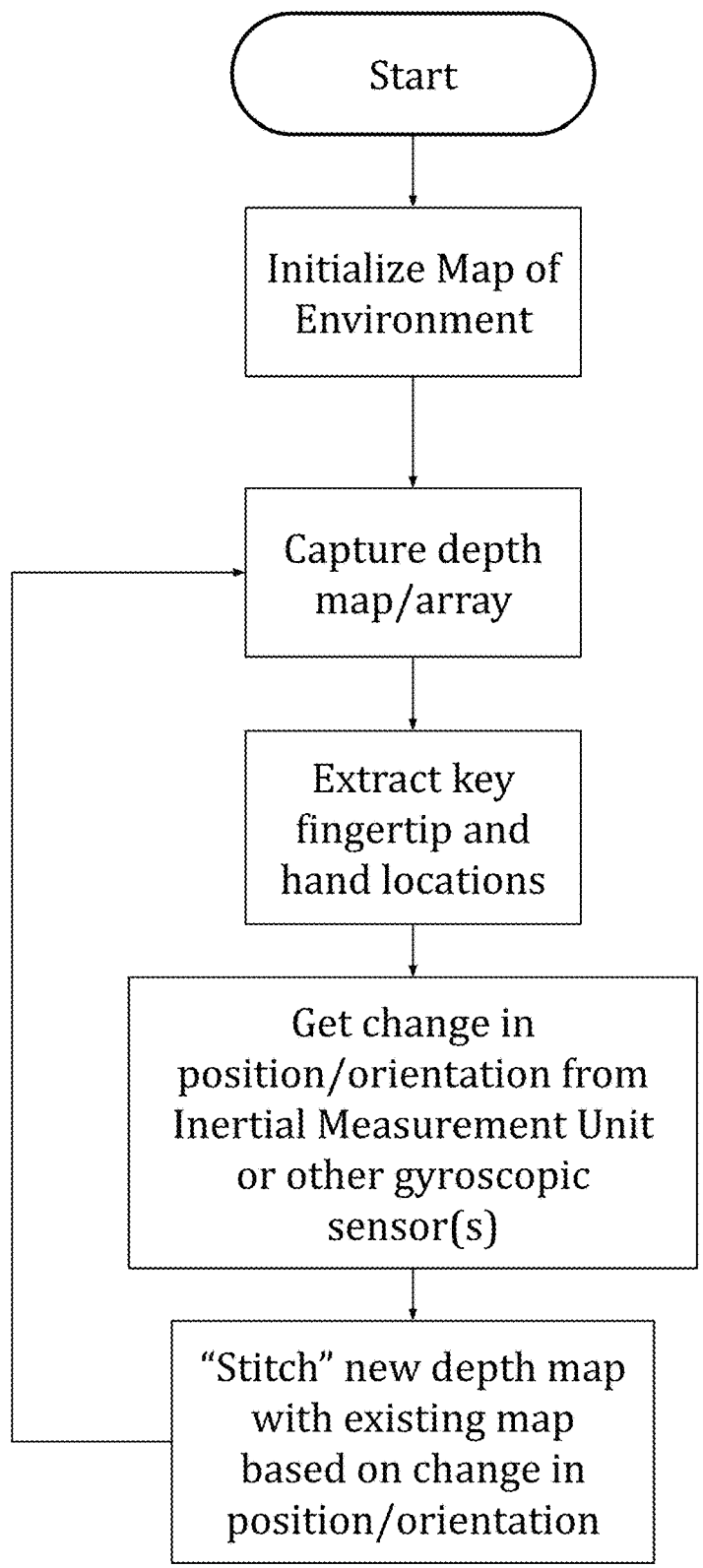

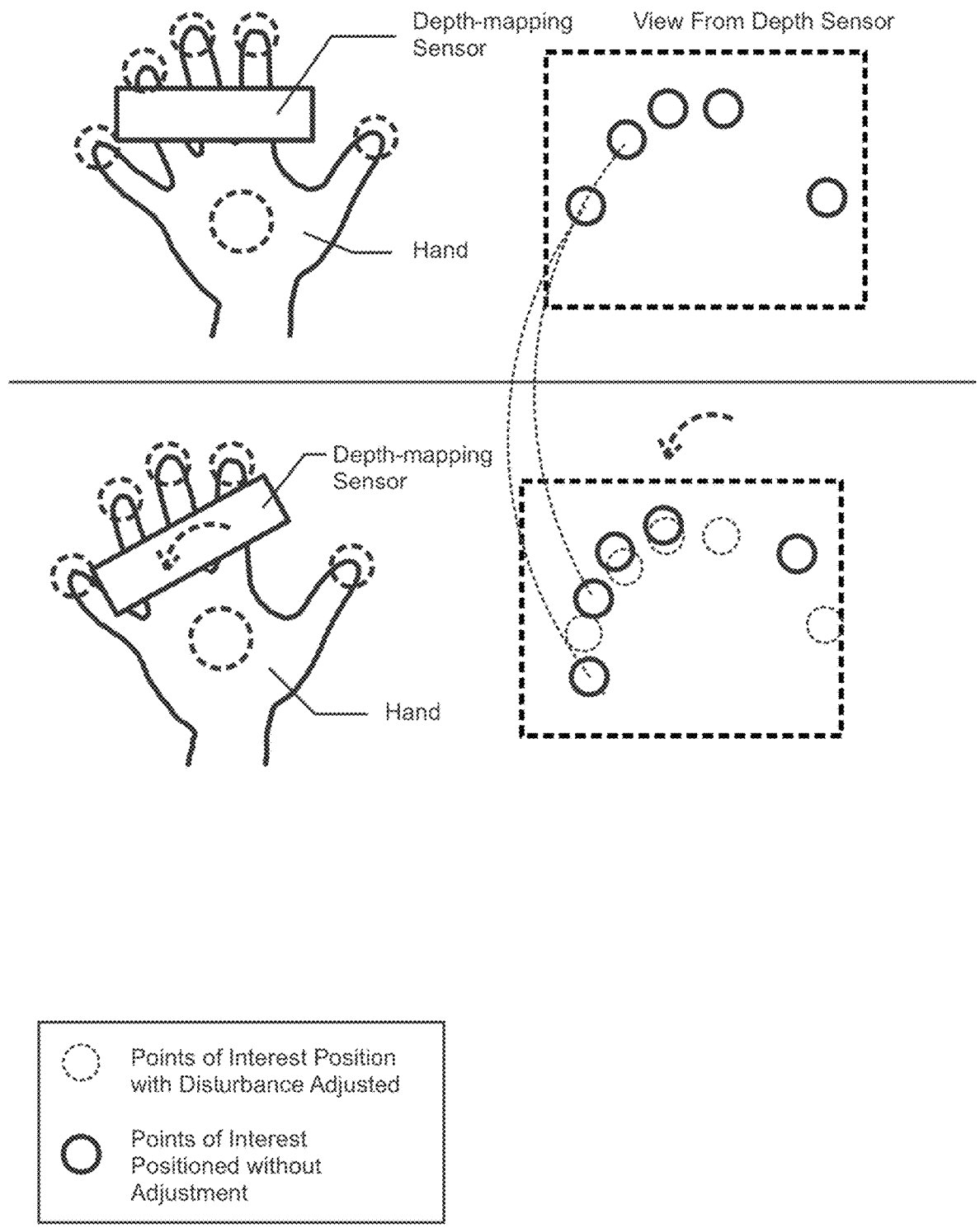

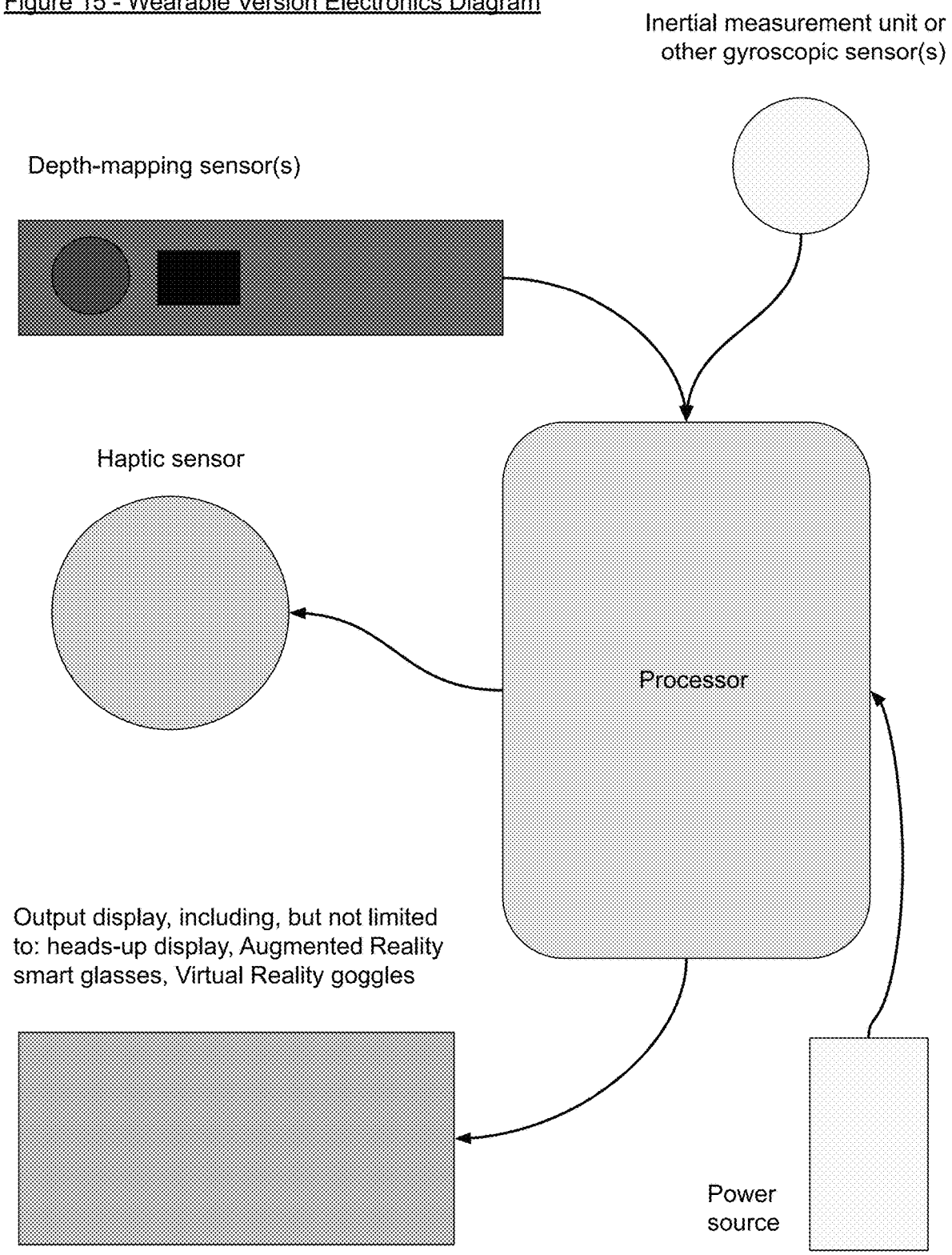

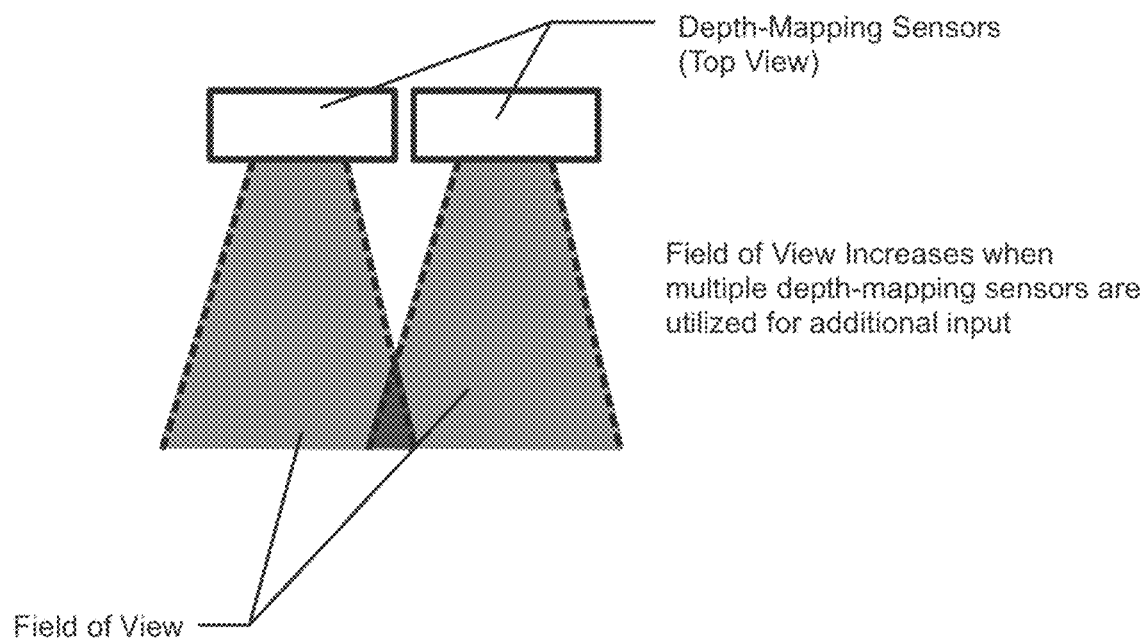
Figure 16: Multiple Embodiments to Increase Field of View

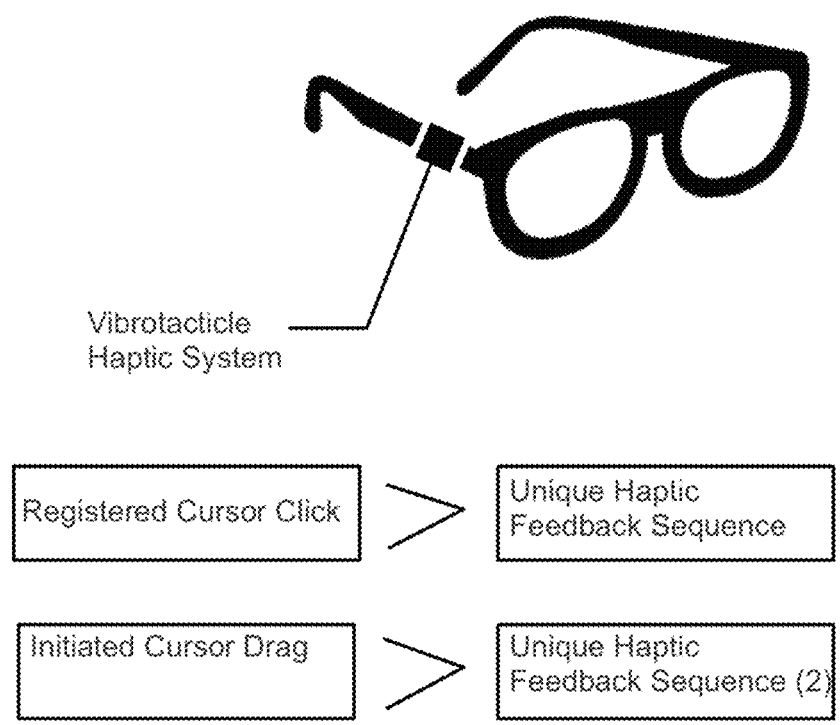

Figure 18 - Determining Angle Between Factors
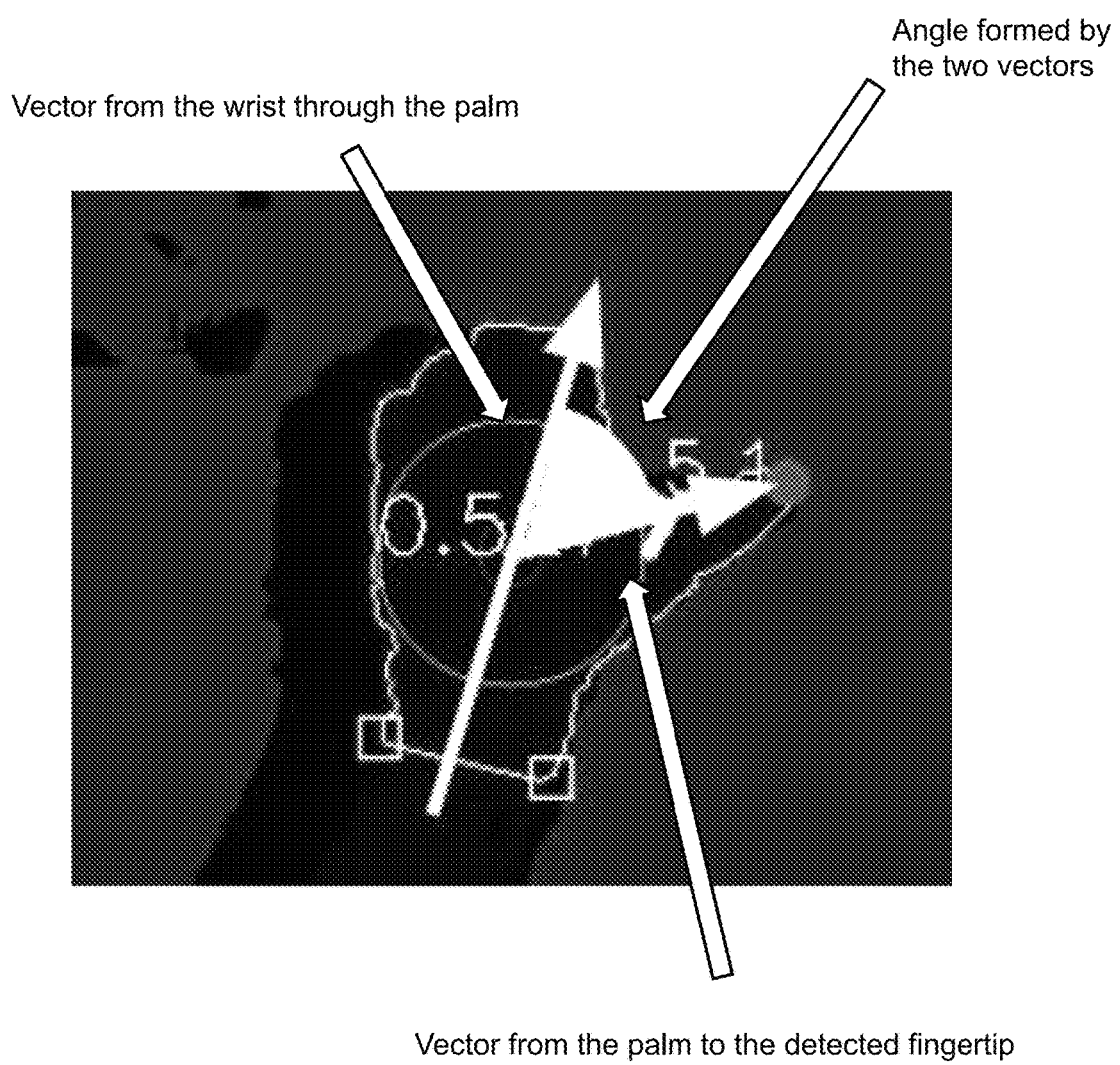

Figure 19 - Angles Corresponding to Fingers
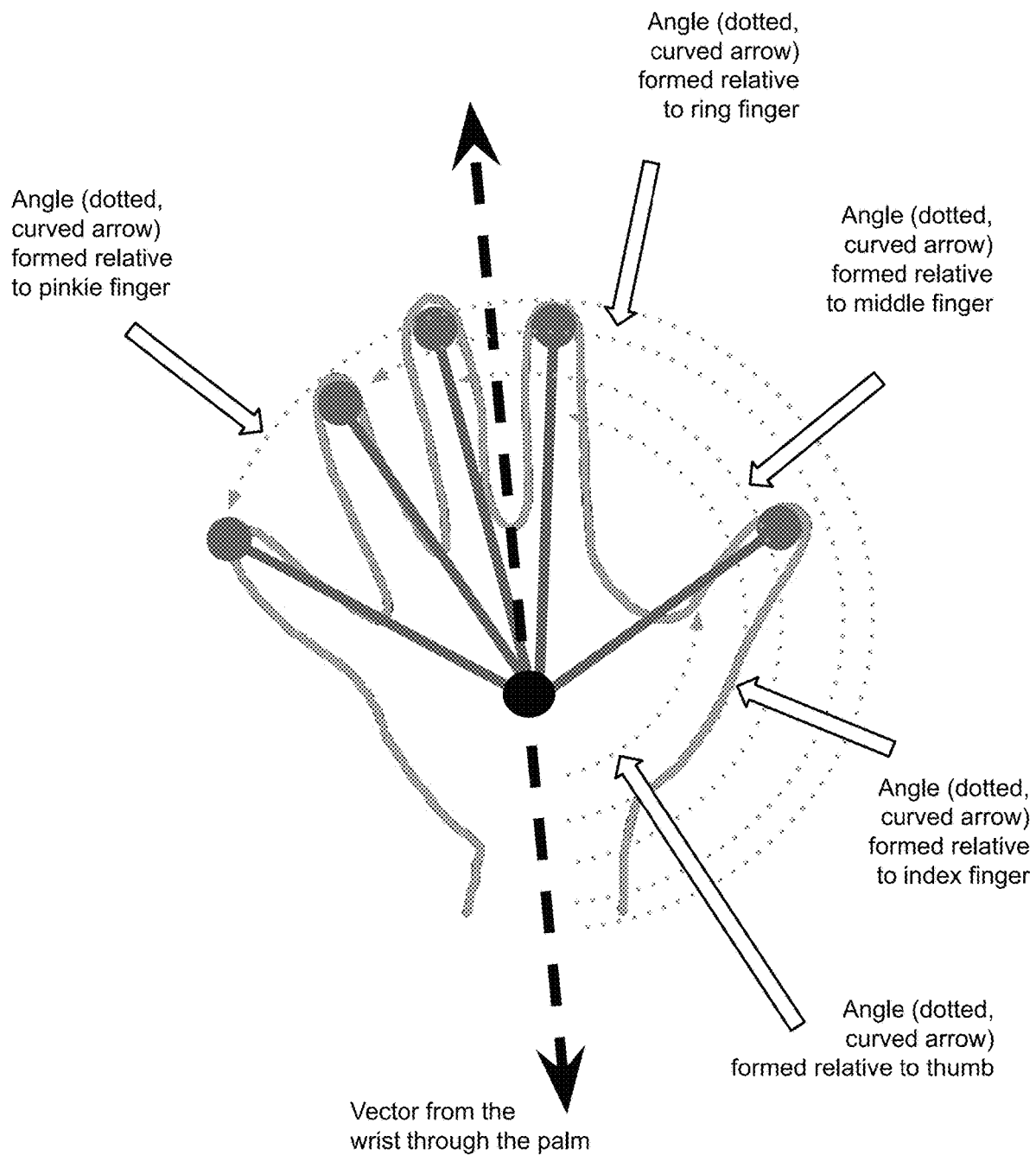

Figure 20 - Changing Appearance of Keyboard GUI
When the user's fingertips are hovering over a key, the key's appearance may change. One example of this is by changing it's color to a different shade.
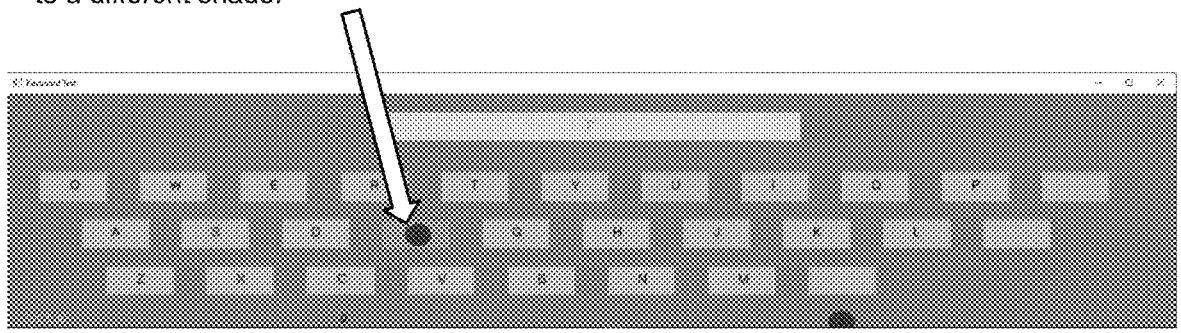
When the keypress has been detected, the key's appearance may change. One example of this is by changing it's color to a different shade.
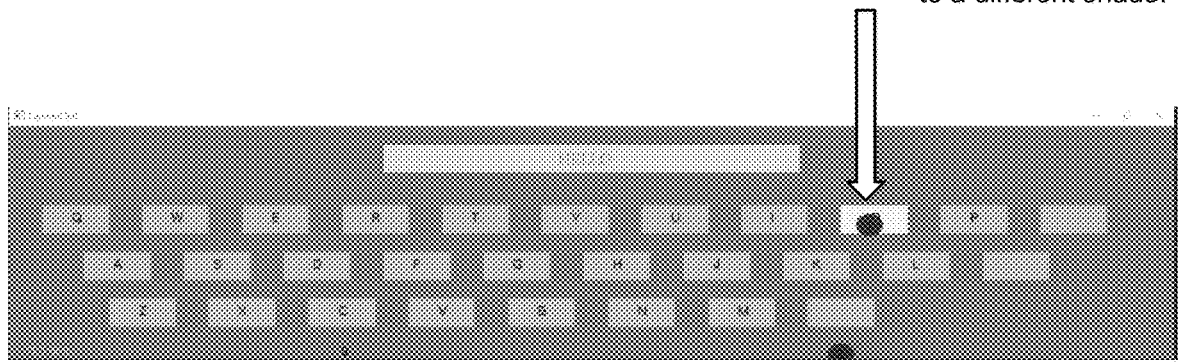

Figures 21-23: Example Hand and Finger Gestures

TOUCHLESS, GESTURE-BASED HUMAN INTERFACE DEVICE

FIELD OF INVENTION

This invention relates to a human interface device for technological devices.

BACKGROUND OF THE INVENTION

Traditional human interface devices (HIDs) such as touch screens, keyboards, and mice generally involve physical contact. This contact has the potential to cross-contaminate and spread disease. Additionally, this may prevent both those with soiled hands and those with disabilities from interacting with technology. Stereo and optical-based touchless human interface devices also generally require higher compute power to process multiple images. Additionally, these cameras may not be able to distinguish between a foreground and background of the same color or function in low-light conditions.

SUMMARY OF THE INVENTION

The object of this invention is to provide touchless interfacing with computing devices.

This embodiments of the present disclosure may utilize a Time of Flight (ToF) or other depth-mapping-based sensor to determine the spatial positions of the user's fingertips. By not relying solely on an optical camera, this invention can work in low-light and low-contrast situations. Using the user's fingertip positions, this embodiments of the present disclosure will allow for touchless interfacing with electronic devices such as laptops, personal computers, tablets, and smartphones. It will have the ability to function as a gesture-based keyboard or computer mouse, providing similar capabilities. Users may have the ability to customize and create their own gestures which correspond to different functions, such as unlocking or dragging.

With the integration of an inertial measurement unit or similar gyroscopic sensor, this invention will be able to move freely and still accurately track the change in users' fingertip positions. One methodology to allow this would be a Simultaneous Localization and Mapping algorithm. As a result, this embodiments of the present disclosure may be implemented in wearables such as smart glasses. Additionally, it can be utilized in functions such as opening doors, checking out at kiosks, or controlling remote machines.

BRIEF DESCRIPTION OF DRAWINGS

FIG. 0 is an illustration of a typical environment of the embodiment. This consists of a depth-mapping sensor and a computer display. Hand(s) are also in view of the sensor, and important parts of the hand are utilized to track movement and position changes.

FIG. 1 is a depiction of the view of an environment from the perspective of a depth-mapping sensor. In this image, pixels are colored based on a grayscale representing depth, with black being the closest to the sensor, and white being the farthest.

FIG. 2 illustrates various stages of a computer vision based image tracking process that may be used to track an important feature on a hand. Image processing can be done using the following or other functions: blurring, contouring, or contrasting. Various image processing techniques are familiar to those skilled in the art.

FIG. 3 illustrates the key features that the embodiments of the present disclosure may track, such as the fingers, fingertips, palm and/or accessories worn. The algorithm utilizes these points to map location in a three-dimensional space, labelled with the coordinates (x,y,z).

FIG. 4 is an illustration of possible hand infrared/depth-mapping sensor placements. The sensor can be mounted above the hand with a downward view, mounted below the hand with an upward view, or in front of the hand with a sideward view.

FIG. 5 includes illustrations of the view of a pointed finger from the perspective of depth sensors with some alternative placements. As depicted, alternate placements result in the same movement being processed in different planes in three-dimensional space.

FIG. 6 depicts an example of a potential logic flow of the algorithm, from processing new sensor data, or "frames", to manipulating a connected device according to determined gesture(s).

FIG. 7 depicts an example of a mouse button press, referred to as "click" gesture detection. The change in depth, assuming the embodiments of the present disclosure are using an overhead mounting placement, meeting a set of criteria (factors such as change in distance and speed), is detected as a "click".

FIG. 8 depicts an example of an alternate mouse button press detection. The change in depth of the two adjacent fingers illustrated, assuming the embodiments of the present disclosure are using an overhead mounting placement, meeting a set of criteria (factors such as change in distance and speed), is detected as an alternate "click", such as a "hidden options" click or right button click.

FIG. 9 depicts an example of a keyboard scenario. The location and distance between all fingers/hands illustrated, assuming the embodiments of the present disclosure are using an overhead mounting placement, meeting a set of criteria (factors such as hand(s) placement), is detected. This information is used to correlate the location of the fingers to keys on a virtual keyboard.

FIG. 10 depicts an example of the virtual keyboard GUI in the "QWERTY" layout. The alphabetical keys are represented as rectangles and the detected fingertips are represented as circles.

FIG. 11 depicts an example of a drag gesture detection, consisting of a pinch followed by a change in hand location, followed by a release (release of pinched fingers). The change in distance between the thumb and index finger, meeting a set of criteria (factors such as change in distance and speed), is detected as a pinch to initiate the drag operation. Next, the change in position of the hand, meeting a set of criteria (factors such as change in distance and speed), is detected as an active drag movement. Finally, the change in distance between the thumb and index finger, meeting a set of criteria (factors such as change in distance and speed), is detected as a release to complete the drag operation.

FIG. 12 is a depiction of an inertial measurement unit and its ability to measure linear velocity, linear acceleration, angular velocity, and angular acceleration in all three dimensions.

FIG. 13 is an example flowchart of the algorithm utilized in Simultaneous Localization and Mapping, which may allow the invention to calculate its true position relative to its starting orientation. This algorithm also can continuously build a 3D map of the background environment as the sensor moves around the environment.

FIG. 14 is a depiction of the invention compensating for positional disturbances. By utilizing sensors such as an inertial measurement unit or gyroscopic sensor(s), the embodiments of the present disclosure may algorithmically adjust the depth arrays captured by the depth-mapping-based sensor(s) to account for these shifts.

FIG. 15 is an example illustration of the electronic components of the embodiment. The depth-mapping sensor(s), inertial measurement unit or gyroscopic sensor(s), and power source are example inputs into the embodiment's processor. The processor relays information to the haptic sensor and output display such as, but not limited to, a heads-up-display, laptop screen, projector, or Virtual Reality goggles.

FIG. 16 is a depiction of multiple embodiments of the present disclosure working concurrently to increase the overall field of view, allowing for a larger portion of the user's environment to be detected.

FIG. 17 is an illustration of a potential haptic feedback example, displaying a vibrotactile haptic system installed on the glasses' frames.

FIG. 18 is a depiction of the angle formed between the vector from the wrist through the palm and vector from the palm through the detected fingertip, in this case the user's thumb.

FIG. 19 is an illustration of the different angles each finger makes relative to the vector from the wrist through the palm, Based on these angles, the invention may distinguish which finger is which.

FIG. 20 is an example depiction of the virtual keyboard GUI changing in appearance based on the states of the users' fingertips.

DESCRIPTION OF INNOVATION

Figure 21:
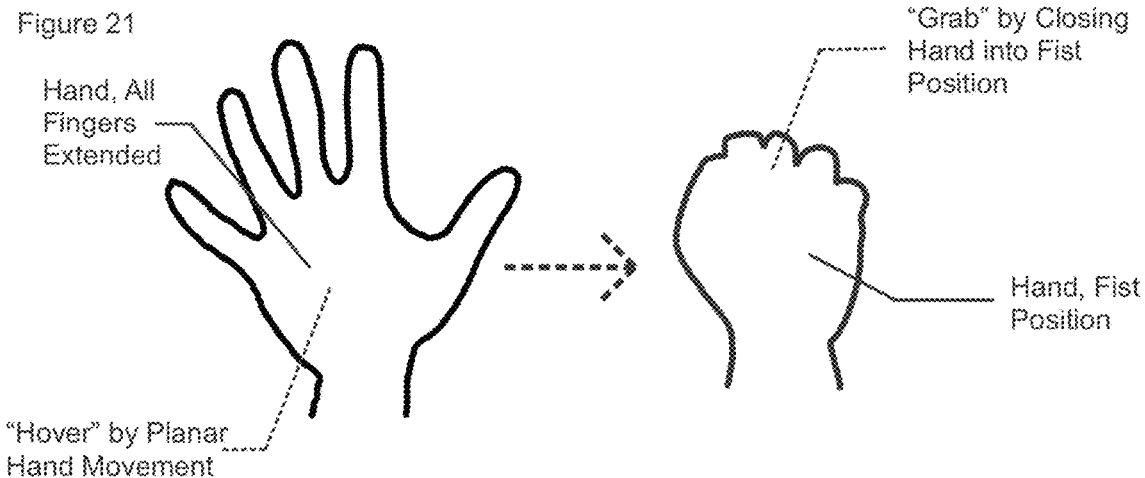
FIG. 21 is an example depiction of the "Grab and Hold" gesture, wherein the users' closed fist signifies a "grab" command and the opening of that closed fist signifies a "release" command.

This invention seeks to provide a solution to these problems by allowing for touchless interaction with a computer device (FIG. 0). By using computer vision algorithms and sensor(s) that provide sensor-to-object distances (FIG. 1), various embodiments of the present disclosure of the invention disclosed here have the potential to accurately determine the position of a user's fingertip(s) and use such information to determine interfacing commands.

One embodiment of the present disclosure of this invention, catered for touchless computer mouse movement, is described below.

A depth-mapping sensor, such as a time-of-flight (ToF) sensor, can be used to get an array of sensor-to-object distances. For every frame received from the depth-mapping sensor, an algorithm omits the background objects and noise to produce a two-dimensional image array of depth-values (FIG. 1). Several Computer Vision algorithms may then be executed (FIG. 2) to find the three dimensional location of the user's palms and fingertips (FIG. 3).

The depth-mapping sensor may be oriented in multiple manners. This includes, but is not limited to: overhead mount, underneath mount, or front facing mount (FIG. 4). Even if it is at a different angle relative to the user's fingertips, the same underlying algorithm may be implemented for detection and tracking. The depth image used will simply be rotated by the appropriate angle to compensate for the difference in orientations. The following example utilizes a Cartesian (x, y, z) coordinate system in 3D space. As an example of the image rotation, if the depth-mapping sensor is facing the user's fingertips, its y-value will be the same as the z-value of the depth-mapping sensor mounted underneath the user. Similarly, it's z-value will correspond to the y-value of the upwards-facing sensor. It's x-value will remain the same (FIG. 5).

For tracking hand movement, the key values of the fingertips and palms will be recorded and compared to the previous values. If they are within their respective thresholds, a command is sent to the computer to update its mouse cursor or pointer position (FIG. 6). Graphical smoothing algorithms such as averaging may be implemented as well to ensure seamless user experience.

A mouse click, or click, is defined as the action of using a mouse pointer, mouse cursor, or similar indicator used to press, select, or interact with an element of a graphical user interface. For determining mouse clicks or a similar basic selection gesture, the depth value between a fingertip of the user's choice and the sensor will be stored. When comparing the current frame to a previous frame, if the change in the depth value meets the threshold requirements, the algorithm will register a click (FIG. 7). In this specific implementation, any horizontal motion will be omitted from the computing process during the fingertip's registered clicking motion. Other algorithms which utilize the change in depth value may be employed to determine mouse clicks as well.

Additional gestures may be utilized for distinguishing between left-clicks and right-clicks. For example, a single index finger moving downwards may correspond to a left-click (FIG. 7) while the index and middle finger moving down together may correspond to a right-click (FIG. 8). The user may also have the capability to input their own customized gesture which corresponds to these computer manipulations.

The embodiments of the present disclosure described above may be used for functions beyond mouse movement as well.

For touchless typing feature, the fingertip locations of all of the user's fingers will be utilized. Users may have the option to calibrate the keyboard by holding their hands in a typing-like position (FIG. 9). The invention may register the three-dimensional positions of the index fingers and map them to the respective home "F" and "J" keys on a "QWERTY" keyboard layout to determine the relative positions of other keys. This will allow the embodiments of the present disclosure to calculate the dimensions and position of a virtual keyboard in the user's physical environment. The aforementioned logic used to define mouse clicks can then be implemented on all of the user's fingers to register keypresses. The planar locations of these clicks will be used to determine which key has been pressed in the mapped space. The user may additionally display a virtual keyboard Graphical User Interface (GUI) as a visual to guide them in typing (FIG. 10).

For dragging capabilities, when the user orients their fingers in a pinching manner, the invention will initiate a "drag" mouse pointer manipulation. The aforementioned logic used to move the virtual mouse pointer will be applied, resulting in a click and hold followed by the virtual object being moved (determined by change in hand position). The user terminates the drag command by releasing their pinched fingers. This capability can be used in the following and similar fashions: digital drawing, digital handwriting, display manipulation, and file organization. These applications can be enhanced through supported apps and programs such as Microsoft Paint and Zoom's whiteboard. The default pinching gesture will be the thumb and index finger being pressed against each other, similar to how a pencil or pen is held (FIG. 11). However, the choice of which fingers to track may be inputted and customized by the user.

Beyond its sensor-to-object depth-measuring sensors, the embodiments of the present disclosure may include a built-in inertial measurement unit or a similar gyroscopic sensor system to allow for true portability (FIG. 12). One implementation is described below.

A gyroscopic sensor or inertial measurement unit will be used as part of the embodiment, attached directly onto the depth-measuring sensor. This system, which additionally can include accelerometer(s), magnetometer(s), and other directional sensors, will allow the invention to calculate its true position relative to its starting orientation. This can be achieved via algorithms such as, but not limited to, the Simultaneous Localization and Mapping (SLAM). A SLAM algorithm will allow the embodiment of the present disclosure to calculate its true position by aggregating the change in position of the invention (FIG. 13). As a result, even if the embodiment(s) of the present disclosure is moved, it will be able to accurately compensate to allow for seamless tracking.

An example will help illustrate the advantage of an inertial measurement unit or similar sensor system. Without loss of generality, if this embodiment of the present disclosure were to be accidentally nudged to the right, then it would track the user's fingers as having been moved to the left, even though the user's fingers may not have moved. The inertial measurement unit will be used by the embodiment's processor to detect that the invention has moved slightly to the right. The processor will then adjust the depth-mapping sensor's output array to compensate for this change. The depth value of each pixel in the depth image will be adjusted according to the angle of the disturbance (FIG. 14).

As a result, the embodiment(s) of the present disclosure will be easily portable and will be able to compensate for motion such as head tilt, jitter, and movement. A possible component of this invention may be the Intel D435i depth camera, which has a built-in inertial measurement unit.

Because of the embodiment's ability to track and compensate for movement in 3D space, the system and its processes may be implemented as a smart wearable device as well. Several features, applications, and additional hardware components are described below.

The embodiments of the present disclosure may produce a visual output to be displayed by a heads-up display such as a pair of smart glasses or other wearable display such as Virtual Reality goggles (FIG. 15). The embodiment's touchless gesture-tracking will allow for seamless interaction with any Augmented Reality or Virtual Reality system without requiring physical contact with any remote controllers. Additionally, multiple depth-mapping sensors may be used in conjunction to track and cover a greater portion of 3D space around the user by increasing its field of view (FIG. 16).

A feedback system, such as haptic, audio, or visual feedback, may additionally be used in the implementation of the invention to signal an executed gesture such as a keyboard press or mouse click to the user (FIG. 17). This will give feedback in different manners based on the corresponding action and can be customized by users.

Other features of this invention are described below.

An additional algorithm can be applied to distinguish which finger is which. This will compute and identify each specific finger/fingertip (ex. "thumb", "index", "middle", "ring", "pinkie"), which can be applied to assist the touchless typing features or other similar processes. One method to enable this would be by using the angle between the vector from the user's fingertip to palm and the vector from the user's palm to wrist (FIG. 18). Angle, position, length, and other parameters can be applied to distinguish finger types and corresponding labels (FIG. 19).

To determine which gesture the user signals, an algorithm uses factors such as, but not limited to, number of fingers pointed, amount/rate of movement, contour of hand(s), and orientation of the user's gestures. In addition, the use of image recognition techniques may be applied to recognize specific gestures.

In order to provide an additional layer of customizability and make a friendly GUI, each key on the virtual keyboard may change based on its current state. If one of the user's fingers is hovering over the key, it may change appearance to signal selection choice. If the key is being pressed down, it may also change appearance. Appearance includes, but is not limited to: text color, background color, shape, and size (FIG. 20). The user may customize the appearance of each state.

Figure 22:
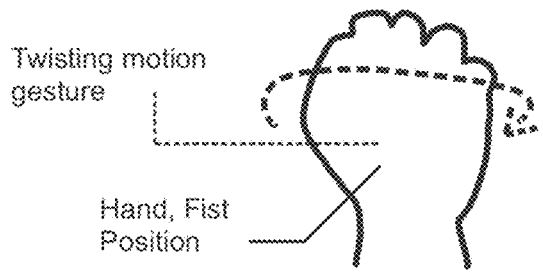
FIG. 22 is an example depiction of the twisting gesture, wherein the user's fist is turned at an angle somewhere between 45 and 180 degrees, similar to the unlocking or locking of a doorknob.
Figure 23:
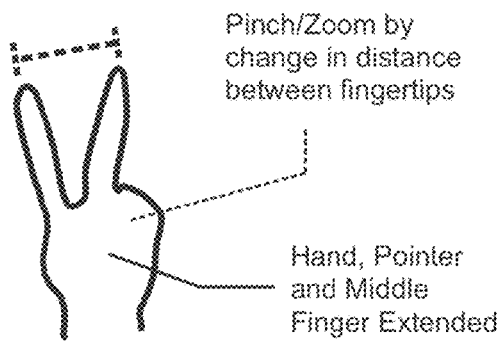
FIG. 23 is an example depiction of the "Pinch and Zoom" gesture, wherein the user's index and middle finger or the user's thumb and middle finger separate by a certain distance.

As another layer of customizability, the user may have the option to input any gestures of their choice and have them correspond to specific functions. For example, several pre-existing gestures could include a twisting motion (similar to turning a doorknob) to correspond to a lock or unlock function, depending on the direction of the twist (FIG. 22). Another example could include a closed first to represent a drag and hold, The release of this first could signify releasing the draggable item, such as when the user wishes to move computer files from one location to another (FIG. 21). Another example could be the separation of the middle and index finger to represent a pinch and zoom (FIG. 23).

In order to input these gestures, the embodiments of the present disclosure may "record" a user's hand motion by storing the depth image of each timestamp that the user's hand is in motion. Then, the invention may track the key fingertip and palm locations from each frame and generate a file that saves this three-dimensional hand motion. Using recognition techniques mentioned previously or similar logic processes, the algorithm will compare any future hand movement to this file to determine whether the same motion is occurring. The user may choose to associate a recorded hand gesture to a specific computer action or function.

The same concepts and algorithms pertaining to the embodiments of the present disclosure can also be applied to any part of the body including accessories worn or carried. Examples include, but are not limited to, detecting arm waving motion, leg kicking motion, a hand with a ring, etc.

One embodiment of the present disclosure has been described thoroughly above. Other modifications and embodiments of the present disclosure made within the scope and spirit of this invention will occur to those skilled in the art who read this disclosure. Therefore, the steps, descriptions, illustrations, and functionalities may vary or be optional.

The invention claimed is:

1. A method for replacing or supplementing human interface devices such as computer keyboards, computer mice, and touchscreens, the method comprising:
   sensing depth data by a depth mapping or infrared sensor apparatus;
   detecting, by use of a computer vision or machine learning algorithm, a presence of a user-manipulated object;
   determining one or more key features of the user-manipulated object, the one or more key features comprising at least one of a user's hands, palms, fingers, fingertips, or wrists;
   determining, based on a change in position of the user-manipulated object, a pattern of input;
   recognizing by a computing device a specific gesture that corresponds to the pattern of input from stored information that includes a plurality of specific gestures and their corresponding different patterns of input; and
   executing, on the computing device based on the recognized specific gesture, one of the one or more instructions stored in a library that are associated with the specific gesture,
   wherein the plurality of stored specific gestures and their corresponding different patterns of input include:
   (i) an unlocking gesture that corresponds to the pattern of input including the user sticking out their hand and twisting the hand in a clockwise manner between approximately 45 and 180 degrees;
   (ii) a left mouse click gesture that corresponds to the pattern of input including one finger of the user's hand moving in a linear, downwards motion followed by an upward motion within a predetermined frame;
   (iii) a right mouse click gesture that corresponds to the pattern of input including two or more fingers of one of the user's hands moving together in a similar linear motion path;
   (iv) a hold control gesture that corresponds to the pattern of input including one of the user's hands shifting from an open hand to a closed fist;
   (v) a drag control gesture that corresponds to the pattern of input including one of the user's hands moving around with the closed fist;
   (vi) a release or drop control gesture that corresponds to the pattern of input including one of the user's hands shifting from the closed fist to an open hand;
   (vii) a pinch and zoom control gesture that corresponds to the pattern of input including the user separating an index finger and a middle finger or a thumb and an index finger;
   (viii) a display pan or scroll control gesture that corresponds to the pattern of input including the user swiping their full hand in a specific direction;
   (ix) a start, pause or stop gesture that corresponds to the pattern of input including the user clapping their hands together; and
   (x) a slider control gesture to control at least one of volume, brightness or color of the computing device that corresponds to the pattern of input including the user changing an elevation of their hand.

2. The method of claim 1, wherein an inertial measurement unit or gyroscopic-based sensing apparatus is used to determine the depth mapping or infrared sensor apparatus's position relative to a starting orientation of the depth mapping or infrared sensor apparatus.

3. The method of claim 2, wherein a simultaneous localization and mapping algorithm is configured to calculate the change in the user-manipulated object's position and adjust a captured depth array.

4. The method of claim 3, wherein the depth mapping or infrared sensor apparatus is in at least one of a portable computer device or wearable technology device with an unfixed position and further wherein the method comprises adjusting for change in position of the depth mapping or infrared sensor apparatus in real-time.

5. The method of claim 2, further comprising mounting the depth mapping or infrared sensor apparatus at any angle and algorithmically accounting and compensating for an angle at which the depth mapping or infrared sensor apparatus is mounted.

6. The method of claim 1, wherein the specific gestures are assigned to the instructions in the library by one or more users from a list of specific controls.

7. The method of claim 1, further comprising creating, by at least one of the one or more users, custom gestures to correspond to specific controls by tracking the one or more key features for a duration of a custom gesture movement and storing data indicative of a trajectory of each of the one or more key features.

8. The method of claim 1, wherein the sensing of the depth data comprises using a plurality of depth mapping or infrared sensor apparatuses to determine object-to-sensor distance or depth values.

9. The method of claim 1, wherein the one or more key features further comprises at least one of the user's wrists, arms, legs, torso, or head.

10. The method of claim 1, further comprising at least one of capturing, storing, removing, or omitting background information for more accurate detection.

11. The method of claim 10, further comprising determining a field of detection and controlling which areas of an environment are used for hand recognition and tracking.

12. The method of claim 1, wherein the detecting distinguishes which finger is which by utilizing a measured angle between a first vector from wrist to palm and a second vector from palm to fingertip.

13. The method of claim 1, wherein the one or more instructions correspond to different patterns of user-provided input that simulate inputs of one or more of a computer mouse, keyboard, keypad, or stylus/smart pen.

14. The method of claim 13, further comprising providing haptic feedback in real-time in response to the determining of the pattern of input.

15. The method of claim 13, further comprising detecting, determining, and executing with respect to multiple users and multiple gestures in real-time.

16. The method of claim 13, further comprising providing sound or visual feedback in real-time in response to the determining of the pattern of input.

17. The method of claim 13, further comprising switching into a low-power mode that conserves a battery's charge, wherein the computer vision or machine learning algorithm is configured to wake up from the low-power mode upon one or more of the following occurring: the user waves, the user is detected, the user enacts one of the plurality of specific gestures, the user issues a voice command, or the user interacts with a physical switch.

18. The method of claim 13, wherein while the user's hand remains stationary and one or more fingers of the user's hand change in location or distance tracked by the depth mapping or infrared sensor apparatus, the method further comprises registering the change as a mouse click of at least one of a laptop, personal computer, smartphone, or tablet without coming in contact with a physical interface device.

19. The method of claim 13, further comprising projecting a virtual keyboard and displaying the virtual keyboard as a visual output on a screen of the computing device.

20. The method of claim 19, wherein the virtual keyboard is calibrated in size, keystone, angle, or other image-resizing specifications, the method sensing two hands in a typing position.

21. The method of claim 20, wherein the virtual keyboard calibration uses factors comprising at least one of a distance between various fingertips or a location of a left hand's pointer finger and right hand's pointer finger to scale and localize a keyboard's keys in a 2D plane parallel to the user's hands.

22. The method of claim 19, further comprising inferring, using the computer vision or machine learning algorithm, a user's intention upon a pressed key area being determined as ambiguous.

23. A method for human interface with a computing device comprising:
sensing, by a depth mapping or infrared sensor apparatus, depth data;
detecting, by use of a computer vision or machine learning algorithm based on the depth data, a presence of a user-manipulated object;
determining one or more key features of the user-manipulated object, the one or more key features comprising at least one of a user's hands, palms, fingers, fingertips, or wrists;
determining, based on the one or more key features, that two of the user's hands are in a typing position;
projecting, based on the determining that the two of the user's hands are in the typing position, a virtual keyboard and displaying the virtual keyboard as a visual output on a screen of the computing device, wherein the virtual keyboard is calibrated in size, keystone, or angle based on position of the two of the user's hands;
determining, based on a change in position of the user-manipulated object, a pattern of input;
recognizing by the computing device a specific gesture that corresponds to the pattern of input from stored information that includes a plurality of specific gestures and their corresponding different patterns of input; and
executing, by the computing device based on the recognized specific gesture, one of the one or more instructions stored in a library that are associated with the specific gesture,
wherein the plurality of stored specific gestures and their corresponding different patterns of input include:
(i) an unlocking gesture that corresponds to the pattern of input including the user sticking out their hand and twisting the hand in a clockwise manner between approximately 45 and 180 degrees;
(ii) a left mouse click gesture that corresponds to the pattern of input including one finger of the user's hand moving in a linear, downwards motion followed by an upward motion within a predetermined frame;
(iii) a right mouse click gesture that corresponds to the pattern of input including two or more fingers of one of the user's hands moving together in a similar linear motion path;
(iv) a hold control gesture that corresponds to the pattern of input including one of the user's hands shifting from an open hand to a closed fist;
(v) a drag control gesture that corresponds to the pattern of input including one of the user's hands moving around with the closed fist;
(vi) a release or drop control gesture that corresponds to the pattern of input including one of the user's hands shifting from the closed fist to an open hand;
(vii) a pinch and zoom control gesture that corresponds to the pattern of input including the user separating an index finger and a middle finger or a thumb and an index finger;
(viii) a display pan or scroll control gesture that corresponds to the pattern of input including the user swiping their full hand in a specific direction;
(ix) a start, pause or stop gesture that corresponds to the pattern of input including the user clapping their hands together; and
(x) a slider control gesture to control at least one of volume, brightness or color of the computing device that corresponds to the pattern of input including the user changing an elevation of their hand.

24. A method for human interface with a computing device comprising:
sensing, by a depth mapping or infrared sensor apparatus, depth data;
simultaneously detecting, by use of a computer vision or machine learning algorithm based on the depth data, a presence of multiple user-manipulated objects manipulated by multiple users;
determining one or more key features of each of the user-manipulated objects, the one or more key features comprising at least one of a respective user's hands, palms, fingers, fingertips, or wrists;
simultaneously determining, based on a change in position of each of the user-manipulated objects, a pattern of input for each of the user-manipulated objects;
recognizing by a computing device specific gestures that corresponds to the patterns of input from stored information that includes a plurality of specific gestures and their corresponding different patterns of input; and
executing, by the computing device based on the recognized gestures, one of the one or more instructions stored in a library that are associated with specific gestures
wherein the plurality of stored specific gestures and their corresponding different patterns of input include:
(i) an unlocking gesture that corresponds to the pattern of input including one of the multiple users sticking out their hand and twisting the hand in a clockwise manner between approximately 45 and 180 degrees;
(ii) a left mouse click gesture that corresponds to the pattern of input including one of the multiple users moving a finger in a linear, downwards motion followed by an upward motion within a predetermined frame;
(iii) a right mouse click gesture that corresponds to the pattern of input including two or more fingers of one of the multiple user's hands moving together in a similar linear motion path;
(iv) a hold control gesture that corresponds to the pattern of input including one of the multiple user's hands shifting from an open hand to a closed fist;
(v) a drag control gesture that corresponds to the pattern of input including one of the multiple user's hands moving around with the closed fist;
(vi) a release or drop control gesture that corresponds to the pattern of input including one of the multiple user's hands shifting from the closed fist to an open hand;

(vii) a pinch and zoom control gesture that corresponds to the pattern of input including one of the multiple user's hands separating an index finger and a middle finger or a thumb and an index finger;

(viii) a display pan or scroll control gesture that corresponds to the pattern of input including one of the multiple users swiping their full hand in a specific direction;

(ix) a start, pause or stop gesture that corresponds to the pattern of input including one of the multiple users clapping their hands together; and (x) a slider control gesture to control at least one of volume, brightness or color of the computing device that corresponds to the pattern of input including one of the multiple users changing an elevation of their hand.

25. A method for human interface with a computing device comprising:

sensing, by a depth mapping or infrared sensor apparatus, depth data, wherein an inertial measurement unit or gyroscopic-based sensing apparatus is used to determine the depth mapping or infrared sensor apparatus's position relative to a starting orientation of the depth mapping or infrared sensor apparatus, wherein the position of the depth mapping or infrared sensor apparatus relative to the starting orientation is used to calibrate the depth mapping or infrared sensor apparatus;

detecting, by use of a computer vision or machine learning algorithm, a presence of a user-manipulated object;

determining one or more key features of the user-manipulated object, the one or more key features comprising at least one of a user's hands, palms, fingers, fingertips, or wrists;

determining, based on a change in position of the user-manipulated object, a pattern of input;

recognizing by a computing device a specific gesture that corresponds to the pattern of input from stored information that includes a plurality of specific gestures and their corresponding different patterns of input; and executing, on the computing device based on the recognized specific gesture, one of the one or more instructions stored in a library that are associated with the specific gesture, wherein the plurality of stored specific gestures and their corresponding different patterns of input include:

(i) an unlocking gesture that corresponds to the pattern of input including the user sticking out their hand and twisting the hand in a clockwise manner between approximately 45 and 180 degrees;

(ii) a left mouse click gesture that corresponds to the pattern of input including one finger of the user's hand moving in a linear, downwards motion followed by an upward motion within a predetermined frame;

(iii) a right mouse click gesture that corresponds to the pattern of input including two or more fingers of one of the user's hands moving together in a similar linear motion path;

(iv) a hold control gesture that corresponds to the pattern of input including one of the user's hands shifting from an open hand to a closed fist;

(v) a drag control gesture that corresponds to the pattern of input including one of the user's hands moving around with the closed fist;

(vi) a release or drop control gesture that corresponds to the pattern of input including one of the user's hands shifting from the closed first to an open hand;

(vii) a pinch and zoom control gesture that corresponds to the pattern of input including the user separating an index finger and a middle finger or a thumb and an index finger;

(viii) a display pan or scroll control gesture that corresponds to the pattern of input including the user swiping their full hand in a specific direction;

(ix) a start, pause or stop gesture that corresponds to the pattern of input including the user clapping their hands together; and (x) a slider control gesture to control at least one of volume, brightness or color of the computing device that corresponds to the pattern of input including the user changing an elevation of their hand.

* * * * *